United States Patent
Sugawara (10) Patent No.: US 6,686,988 B1
(45) Date of Patent: Feb. 3, 2004

(54) OPTICAL SYSTEM, AND STEREOSCOPIC IMAGE PHOTOGRAPHING APPARATUS HAVING THE SAME

(75) Inventor: Saburo Sugawara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 159 days.

(21) Appl. No.: 09/694,505

(22) Filed: Oct. 24, 2000

(30) Foreign Application Priority Data

Oct. 28, 1999 (JP) .......................................... 11-306841

(51) Int. Cl.$^7$ ........................ G03B 35/14; G03B 35/00; G02B 27/22
(52) U.S. Cl. .................... 355/22; 359/462; 396/327; 396/331
(58) Field of Search ................................ 396/327, 331; 355/22, 57; 353/7; 359/462; 348/46, 49

(56) References Cited

U.S. PATENT DOCUMENTS

| 3,244,878 A | * | 4/1966 | Stein et al. .................... 378/41 |
| 5,134,524 A | | 7/1992 | Hamano et al. ............. 359/687 |
| 5,247,393 A | | 9/1993 | Sugawara .................... 359/690 |
| 5,257,134 A | | 10/1993 | Sugawara .................... 359/679 |
| 5,303,088 A | | 4/1994 | Sugawara .................... 359/753 |
| 5,341,243 A | | 8/1994 | Okuyama et al. ........... 359/687 |
| 5,530,593 A | | 6/1996 | Shibayama et al. ......... 359/689 |
| 5,550,679 A | | 8/1996 | Sugawara .................... 359/689 |
| 5,552,938 A | | 9/1996 | Sugawara .................... 359/691 |
| 5,600,490 A | | 2/1997 | Sugawara et al. ........... 359/690 |
| 5,684,635 A | | 11/1997 | Sugawara .................... 359/643 |
| 5,701,475 A | | 12/1997 | Sugawara .................... 359/644 |
| 5,757,553 A | | 5/1998 | Sugawara .................... 359/643 |
| 5,781,349 A | | 7/1998 | Sugawara .................... 359/691 |
| 5,835,133 A | * | 11/1998 | Moreton et al. .............. 348/49 |
| 5,920,433 A | | 7/1999 | Sugawara .................... 359/663 |
| 5,926,316 A | | 7/1999 | Sugawara .................... 359/557 |
| 5,966,247 A | | 10/1999 | Goosey et al. .............. 359/689 |
| 5,969,873 A | | 10/1999 | Sugawara .................... 359/645 |
| 5,969,875 A | | 10/1999 | Sugawara .................... 359/651 |
| 5,973,847 A | | 10/1999 | Sugawara .................... 359/644 |
| 5,986,806 A | | 11/1999 | Sugawara .................... 359/557 |
| 6,008,949 A | | 12/1999 | Sugawara .................... 359/644 |
| 6,363,225 B1 | | 3/2002 | Sugawara .................... 396/331 |
| 6,414,791 B1 | | 7/2002 | Sugawara .................... 359/497 |

FOREIGN PATENT DOCUMENTS

JP        6-327036        11/1994

* cited by examiner

Primary Examiner—Rodney Fuller
(74) Attorney, Agent, or Firm—Fitzpatrick, Cella, Harper & Scinto (57) ABSTRACT

An optical system includes a pair of front optical components, an optical member for superposing respective optical axes of the pair of front optical components on each other, a rear optical component disposed such that the superimposed optical axes coincide with an optical axis of the rear optical component, the rear optical component including a lens unit arranged to move during zooming, and a lens unit arranged to move during focusing and disposed on an object side of the lens unit arranged to move during zooming, and a pair of shutters capable of independently controlling amounts of transmission of light fluxes respectively entering the pair of front optical components from an object. The optical system forms parallactical images in a time-series manner by causing the pair of shutters to alternately change the amounts of transmission of light fluxes respectively entering the pair of front optical components from the object.

30 Claims, 6 Drawing Sheets

FIG.7A
FNO/1.8

SPHERICAL ABERRATION

FIG.7B
ω=21.3°

ASTIGMATISM

FIG.7C
ω=21.3°

DISTORTION (%)

FIG.7D
ω=21.3°

LATERAL CHROMATIC ABERRATION (g-LINE)

FIG.8A
FNO/3.1

SPHERICAL ABERRATION

FIG.8B
ω=13.9°

ASTIGMATISM

FIG.8C
ω=13.9°

DISTORTION (%)

FIG.8D
ω=13.9°

LATERAL CHROMATIC ABERRATION (g-LINE)

FIG.9A
FNO/4.5

SPHERICAL ABERRATION

FIG.9B
ω=7.8°

ASTIGMATISM

FIG.9C
ω=7.8°

DISTORTION (%)

FIG.9D
ω=7.8°

LATERAL CHROMATIC ABERRATION (g-LINE)

FIG.10

OPTICAL SYSTEM, AND STEREOSCOPIC IMAGE PHOTOGRAPHING APPARATUS HAVING THE SAME

BACKGROUND OF THE INVENTION

1. Field of the Invention

The present invention relates to an optical system and a stereoscopic image photographing apparatus having the optical system, which are adapted to obtain a stereoscopic image by leading images having parallax for right and left eyes (parallactical images) alternately in a time-series manner to one image sensor with a shutter means.

2. Description of Related Art

In order to observe a stereoscopic image, it is necessary to produce a plurality of parallactical images. Heretofore, there have been proposed a variety of stereoscopic-image-photographing optical apparatuses or stereoscopic-image-photographing optical systems for obtaining a plurality of parallactical images.

Among the above stereoscopic-image-photographing optical apparatuses or optical systems, there has been proposed, for example, in Japanese Laid-Open Patent Application No. Hei 6-327036, a stereoscopic image photographing apparatus in which images having parallax for right and left eyes are led alternately in a time-series manner to one and the same area of one image sensor by utilizing a liquid crystal shutter. Referring to FIG. 1 set forth in Japanese Laid-Open Patent Application No. Hei 6-327036, the stereoscopic image photographing apparatus is composed of two reflection mirrors provided respectively for right and left eyes, a liquid crystal shutter arranged to be drivable divisionally in area, and a photographic lens. Then, the liquid crystal shutter is disposed in the vicinity of the entrance pupil of the photographic lens on the object side of the photographic lens, so that images having parallax for right and left eyes can be inputted alternately to one image sensor.

However, in Japanese Laid-Open Patent Application No. Hei 6-327036, there is no disclosure as to a zoom lens adapted for photographing a stereoscopic image, and, further, there is no disclosure as to a particular method of compensating for the shift of an image plane relative to a change of the object distance.

In an optical system for use in photographing a stereoscopic image, it is important to obtain parallactical images for right and left eyes with high optical performance, so as to enable a stereoscopic image to be observed well.

BRIEF SUMMARY OF THE INVENTION

It is an object of the invention to provide an optical system and a stereoscopic image photographing apparatus which are capable of making it easy to manually or automatically adjust focus according to a change of the object distance and are capable of obtaining parallactical images excellent in optical performance.

To attain the above object, in accordance with an aspect of the invention, there is provided an optical system, which comprises a pair of front optical components, an optical member for superposing respective optical axes of the pair of front optical components on each other, a rear optical component disposed such that the superimposed optical axes coincide with an optical axis of the rear optical component, the rear optical component including a lens unit arranged to move during zooming, and a lens unit arranged to move during focusing and disposed on an object side of the lens unit arranged to move during zooming, and shutter means capable of independently controlling amounts of transmission of light fluxes respectively entering the pair of front optical components from an object, wherein the optical system forms parallactical images in a time-series manner by causing the shutter means to alternately change the amounts of transmission of light fluxes respectively entering the pair of front optical components from the object.

In addition, in accordance with another aspect of the invention, there is provided an optical system, which comprises a pair of front optical components, each of the pair of front optical components having an optical power, an optical member for superposing respective optical axes of the pair of front optical components on each other, a rear optical component disposed such that the superimposed optical axes coincide with an optical axis of the rear optical component, the rear optical component including, on a most object side thereof, a lens unit arranged to move during focusing, and shutter means capable of independently controlling amounts of transmission of light fluxes respectively entering the pair of front optical components from an object, wherein the optical system forms parallactical images in a time-series manner by causing the shutter means to alternately change the amounts of transmission of light fluxes respectively entering the pair of front optical components from the object.

In addition, in accordance with a further aspect of the invention, there is provided an optical system, which comprises, in order from an object side to an image side, a first lens unit of negative optical power, a second lens unit, the second lens unit moving during focusing, a third lens unit of positive optical power, the third lens unit moving during zooming, and a fourth lens unit of positive optical power, the fourth lens unit moving during zooming.

In addition, in accordance with a still further aspect of the invention, there is provided a stereoscopic image photographing apparatus, which comprises an optical system according to each of the above aspects, and an image sensor disposed on an image forming plane of the optical system.

These and further aspects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

Figure 1:
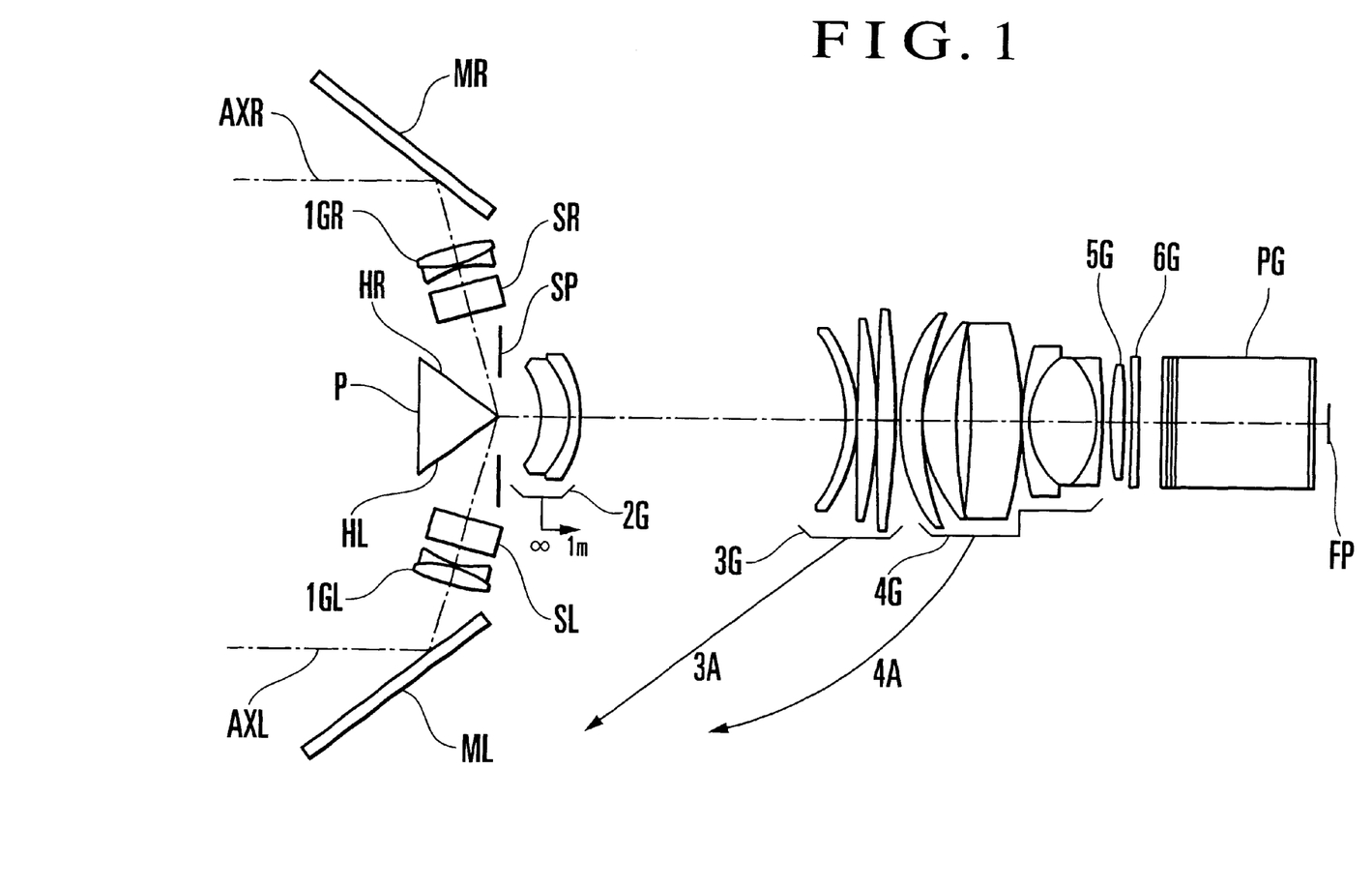
FIG. 1 is an outline diagram showing the essential parts of a stereoscopic image photographing apparatus using a stereoscopic-image-photographing optical system according to an embodiment of the invention.

FIG. 1 is an optical sectional view showing the essential parts of a stereoscopic image photographing apparatus using a stereoscopic-image-photographing optical system according to an embodiment of the invention. The stereoscopic-image-photographing optical system shown in FIG. 1 is constructed as a zoom lens and is arranged to obtain two parallactical images in a time-series manner.

The stereoscopic-image-photographing optical system shown in FIG. 1 is composed of two reflection mirrors MR and ML, for right and left eyes, arranged to deflect inwards optical axes AXR and AXL, for right and left eyes, disposed approximately in parallel at an interval about equal to the interpupillary distance of the man, two first lens units 1GR and 1GL of negative refractive power, for right and left eyes, having the same construction, two liquid crystal shutters SR and SL, for right and left eyes, serving as an amount-of-light control means, a triangular prism (a combining optical element) P having reflective coating (high-reflection coating) applied to surfaces HR and HL thereof for superposing the right and left optical axes AXR and AXL on each other and disposed at the position of or in the vicinity of a stop SP, the stop SP arranged to adjust the amount of light, a second lens unit 2G having a weak refractive power as a whole and arranged to move during focusing, a third lens unit 3G of positive refractive power as a whole arranged to move along the optical axis from the image side toward the object side during the variation of magnification from the wide-angle end to the telephoto end, a fourth lens unit 4G of positive refractive power as a whole arranged to move along the optical axis to compensate for the shift of an image plane due to the variation of magnification from the wide-angle end to the telephoto end, a fifth lens unit 5G of positive refractive power as a whole arranged to be movable along the optical axis to correct the unevenness in the back focal distance of individual optical systems, a sixth lens unit 6G of negative refractive power, and a color separation prism PG including an optical low-pass filter LPF. The color separation prism PG has the role of separating light from the object into three light components of red, green and blue. Accordingly, on an image plane FP, there are disposed three image sensors (CCDs) correspondingly with optical paths of the respective light components. However, in FIG. 1, only one image plane FP is shown, and the remaining two image planes are omitted from the illustration for the purpose of simplification.

In the present embodiment, the positional shift of an image plane due to a change of the object distance is compensated for by moving the second lens unit 2G along the optical axis, and the variation of magnification and the compensation for the shift of an image plane due to the variation of magnification are performed by moving the third lens unit 3G and the fourth lens unit 4G from the image side to the object side during the variation of magnification from the wide-angle end to the telephoto end.

Further, at the time of the assembly and adjustment of lenses, the discrepancy in the position of an image plane between the wide-angle end and the telephoto end during the variation of magnification is corrected by moving the first lens units 1GR and 1GL, for right and left eyes, independent of each other along the optical axis.

Further, at the time of the assembly and adjustment of lenses, the unevenness in the back focal distance is corrected by moving the fifth lens unit 5G along the optical axis.

In addition, the first lens units 1GR and 1GL constitute a pair of front lens units (a pair of front optical components), and the second lens unit 2G to the sixth lens unit 6G constitute a rear lens unit (a rear optical component). The front lens unit 1GR or 1GL and the rear lens unit constitute a zoom lens.

Then, images having parallax for right and left eyes are led alternately in a time-series manner onto the image sensor (CCD) by alternately opening and closing the above-mentioned liquid crystal shutters (amount-of-light control means) SR and SL for right and left eyes.

Figure 10:
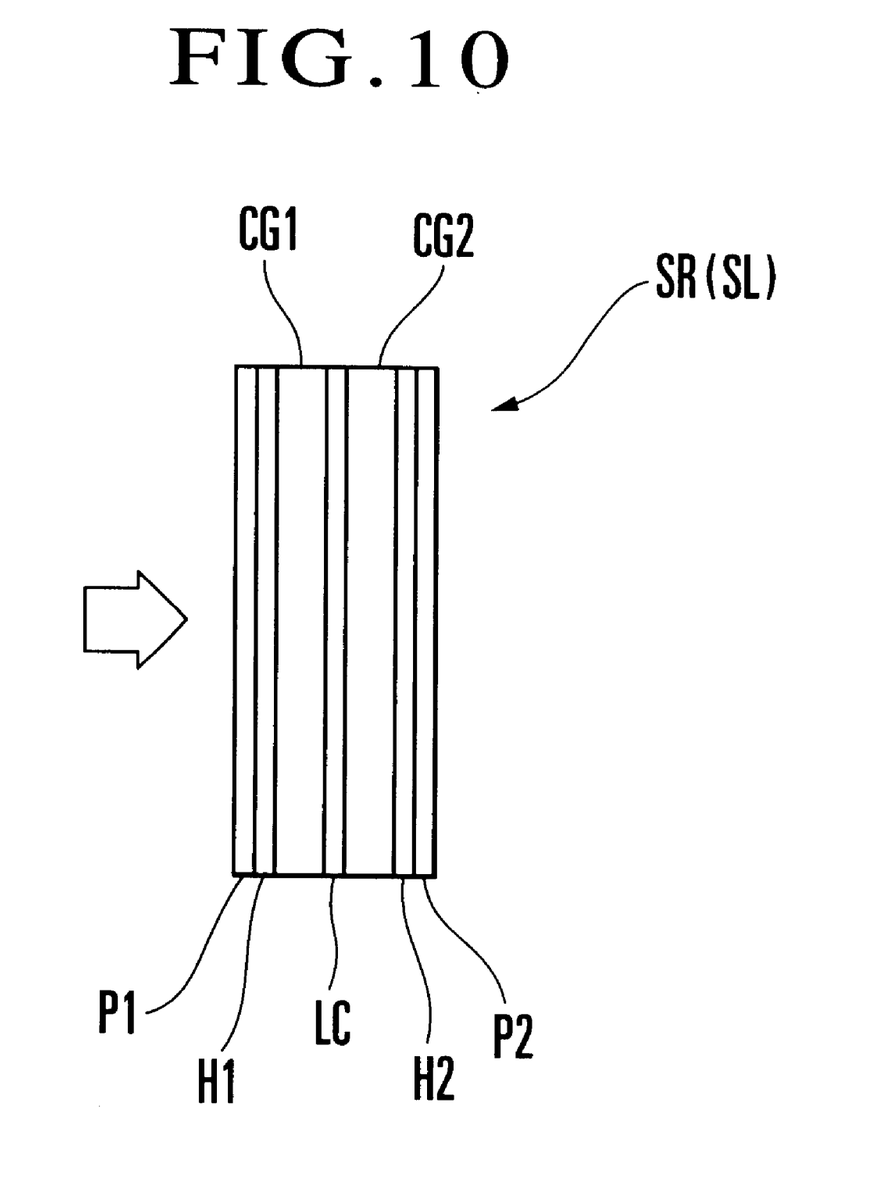
FIG. 10 is a sectional view showing the essential parts of a liquid crystal shutter.

FIG. 10 is a sectional view showing the essential parts of the liquid crystal shutter SR (SL) shown in FIG. 1. Referring to FIG. 10, each of the liquid crystal shutters SR and SL for right and left eyes is composed of, from the object side, a ¼ wavelength plate P1, a polarizing plate H1, a cover glass CG1, a liquid crystal layer LC, a cover glass CG2, a polarizing plate H2 and a ¼ wavelength plate P2. Surfaces opposed to the liquid crystal layer LC are provided with transparent electrodes.

The liquid crystal shutters SR and SL for right and left eyes are respectively disposed between the associated one of the first lens units 1GR and 1GL of negative refractive power for right and left eyes and the triangular prism P, so that an angle of incidence of an off-axial principal ray on each of the liquid crystal shutters SR and SL for right and left eyes is made small. Accordingly, a leakage of light occurring at the time of closing of the liquid crystal shutter SR or SL over the entirety of a light receiving surface of the image sensor (CCD) is made small. By this arrangement, a maximum angle of incidence of a light flux on the liquid crystal shutter SR or SL is reduced to half or smaller as compared with a case where the liquid crystal shutters SR and SL are respectively disposed on the object side of the first lens units 1GR and 1GL.

Further, the first lens units 1GR and 1GL are respectively disposed on the object side of the triangular prism P serving as an image combining means (a combining optical element), so that the whole stereoscopic-image-photographing optical system is formed into a retro-focus construction. Accordingly, it is easy to obtain the sufficient back focal distance and to realize a wide angle of view. In addition, as against the increase of an angle of incidence of an off-axial principal ray on the surface of the liquid crystal shutter SR or SL due to the realization of a wide angle of view, each of the first lens units 1GR and 1GL is made to have a negative refractive power, so that an angle of incidence of an off-axial principal ray on the surface of the liquid crystal shutter SR or SL in the vicinity of the stop SP is made small.

Further, the ¼ wavelength plates P1 and P2 are respectively disposed both on the object side and the image side of the liquid crystal shutter SR or SL composed of the liquid crystal layer LC and two polarizing plates H1 and H2, so that it is possible to prevent a change in gloss of an object due to polarization, or the occurrence of moire caused by the decrease of an effect of the crystal low-pass filter LPF due to polarization, thereby enabling a natural image to be photographed.

With the ¼ wavelength plates P1 and P2 respectively disposed both on the object side and the image side of the liquid crystal shutter SR or SL, linearly-polarized light passing through the liquid crystal shutter SR or SL becomes circularly-polarized light both on the object side and the image side, thereby lessening the influence of an object having a polarizing characteristic, or lessening the decrease of an effect of the crystal low-pass filter LPF, which separates rays of light by utilizing double refraction.

Referring to FIG. 1, during the variation of magnification from the wide-angle end to the telephoto end, the third lens unit G3 and the fourth lens unit G4 move along the optical axis respectively with loci 3A and 4A shown in FIG. 1 to perform the variation of magnification and the compensation for the shift of an image plane due to the variation of magnification. When the object distance changes from an infinite distance to a minimum object distance, the second lens unit G2 moves from the object side toward the image side along the optical axis to perform focusing.

Since the second lens unit 2G is located on the object side of a lens unit arranged to move for the variation of magnification (the third lens unit 3G and the fourth lens unit 4G), the amount of drawing-out of the second lens unit 2G relative to a change of the object distance is made constant at any position of the variation of magnification, so that, in particular, the operability obtained when the adjustment of focus is performed manually is excellent. Further, in a case where the compensation for the shift of focus due to a change of the object distance is performed on the basis of information supplied from a distance measuring device (not shown), since it is unnecessary to vary the amount of drawing-out of the second lens unit 2G according to the position of the variation of magnification, it is possible to realize an automatic focus adjustment with a simple circuit configuration.

As shown in FIG. 1, the entrance pupil (stop) SP of the stereoscopic-image-photographing optical system is provided on the object side inside the stereoscopic-image-photographing optical system, and the triangular prism P is arranged such that, at the entrance pupil SP, images for right and left eyes (parallactical images) are led to the second lens unit 2G.

In the present embodiment, an aperture of the stop SP is divided into two parts by the triangular prism (combining optical element) P provided at the stop SP. The respective optical axes of the pair of front lens units are superposed on each other on the ridgeline including an apex angle of the triangular prism P, and the superposed optical axes coincide with the optical axis of the rear lens unit. Then, the transmittances of the shutters SR and SL for right and left eyes are alternately changed, so that parallactical images for right and left eyes are obtained in a time-series manner at the image sensor disposed at the image plane FP.

In the present embodiment, with the above construction, the diameter of a front lens member of the stereoscopic-image-photographing optical system is made small, and the spread of an off-axial light flux is restrained. By this arrangement, the two reflection mirrors MR and ML for right and left eyes and the two shutters SR and SL for right and left eyes can be reduced in size, so that it is possible to realize a stereoscopic-image-photographing optical system which is small-sized as a whole.

In particular, in the present embodiment, in order to reduce the size of each of the shutters SR and SL, the shutters SR and SL are respectively disposed between the associated one of the reflection mirrors MR and ML and the triangular prism P. Incidentally, the shutters SR and SL may be mechanical shutters instead of the liquid crystal shutters as in the present embodiment.

Further, an angle (apex angle) which two reflection surfaces HR and HL of the triangular prism P make with each other is set to 75 degrees, in the embodiment shown in FIG. 1, taking into consideration the eclipse of an effective light flux due to the stop SP or the reduction in size of the reflection mirrors MR and ML.

Further, in the construction according to the present embodiment, since the variation of magnification is performed by the rear lens unit after the respective optical axes of the pair of the first lens units 1GR and 1GL are made to coincide with each other by the combining optical element P, there is such an advantage that the difference in magnification between right and left eyes or the discrepancy of the optical axes during the variation of magnification does not occur.

While, in the embodiment shown in FIG. 1, the compensation for the shift of an image plane due to a change of the object distance (focusing) is performed by the second lens unit 2G, a lens unit other than the second lens unit 2G may be used easily for the compensation for the shift of an image plane due to a change of the object distance, insofar as it is a lens unit disposed on the object side of the lens unit arranged to move during focusing and is a lens unit other than the first lens unit 1GR or 1GL.

Further, in order to further adjust the amount of light, the aperture of the stop SP may be varied, or an amount-of-light attenuating filter may be detachably inserted between the first lens unit 1GR or 1GL and the reflection mirror MR or ML, or between the first lens unit 1GR or 1GL and the triangular prism P, according to the brightness of an object.

Further, parallactical images may be obtained by making the reflection mirrors MR and ML rotatable and varying the distance by which the optical axes AXR and AXL for right and left eyes intersect on the object side, on the basis of distance information obtained from a distance measuring device (not shown). By this arrangement, it is possible to obtain a stereoscopic image easier to view.

Further, the triangular prism P may be composed of two plane mirrors. In addition, the reflection mirrors MR and ML may be composed of reflection prisms. By this arrangement, the spread of an off-axial light flux is suppressed, so that it is possible to realize a stereoscopic-image-photographing optical system which is more reduced in size.

Figure 2:
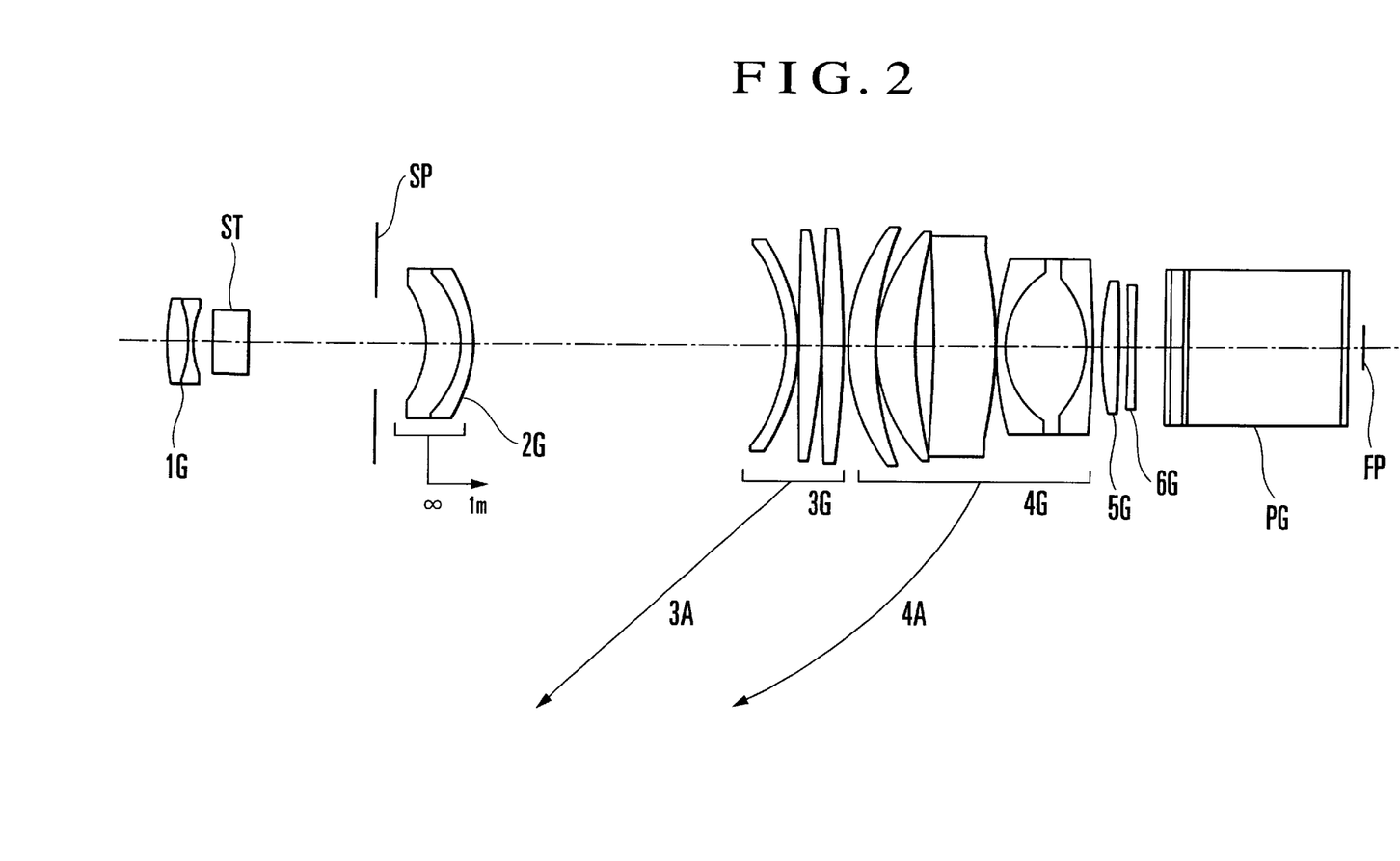
FIG. 2 is a lens block diagram showing a stereoscopic-image-photographing optical system according to a numerical example 1.

FIG. 2 is an optical sectional view showing a stereoscopic-image-photographing optical system according to a numerical example 1 of the invention. In FIG. 2, the triangular prism P and the reflection mirrors MR and ML shown in FIG. 1 are omitted from the illustration, and only one of lens systems for right and left eyes of the stereoscopic-image-photographing optical system is shown with an optical path thereof expanded. The lens construction shown in FIG. 2 is the same as that shown in FIG. 1.

The stereoscopic-image-photographing optical system according to the numerical example 1 comprises, in order from the object side to the image side, a first lens unit 1G of negative refractive power, a second lens unit 2G having a weak refractive power, a third lens unit 3G of positive refractive power, a fourth lens unit 4G of positive refractive power, a fifth lens unit 5G of positive refractive power, and a sixth lens unit 6G of negative refractive power, in which the positional shift of focus due to a change of the object distance is compensated for by moving the second lens unit 2G along the optical axis, and the variation of magnification and the positional shift of focus due to the variation of magnification are compensated for by moving the third lens unit 3G and the fourth lens unit 4G along the optical axis.

Referring to FIG. 2, the first lens unit 1G is constructed with, in order from the object side to the image side, a cemented lens having a convex surface facing the object side and composed of a positive lens of bi-convex form and a negative lens of bi-concave form. Further, a lens surface on the most object side of the first lens unit 1G is an aspheric surface, thereby correcting well astigmatism and distortion, which are made to occur greatly by the first lens unit 1G having a strong negative refractive power. In addition, the use of such an aspheric surface makes it possible to construct the first lens unit 1G with a small number of lens elements, so that the interval between the optical axes for right and left eyes can be set small, thereby reducing the size of the whole stereoscopic image photographing apparatus. Further, with the first lens unit 1G being a cemented lens composed of two lenses having the above-mentioned shapes, the sensitivity of a change of aberration relative to the manufacturing error of an aspheric lens is made small. Further, a deviation of the curvature on the cementing surface side of the aspheric lens, which is, in many cases, made by molding, from the design value is compensated for by filling in a space between the bi-convex lens (aspheric lens) and the bi-concave lens with adhesive, thereby lowering the sensitivity of the deviation. Further, it is desirable from the viewpoint of the effect of correction of distortion that the aspheric surface is applied to a lens surface on the most object side of the first lens unit, where the height of an off-axial principal ray from the optical axis is greatest. In addition, it is preferable that the aspheric surface is such an aspheric surface that a positive refractive power becomes stronger progressively toward a marginal portion thereof, when applied to a surface producing the converging function, or is such an aspheric surface that a negative refractive power becomes weaker progressively toward a marginal portion thereof, when applied to a surface producing the diverging function.

The second lens unit 2G is constructed with a cemented lens of meniscus form having a weak refractive power as a whole, having a concave surface facing the object side and composed of, in order from the object side to the image side, a lens of meniscus form having a concave surface facing the object side and a negative lens of meniscus form having a concave surface facing the object side. The reason why the second lens unit 2G is of the meniscus form, as a whole, having a concave surface facing the object side is that, since the second lens unit 2G has the diverging function on the object side and the converging function on the image side although having a low refractive power as a whole, the whole second lens unit 2G is made to have the function of a wide afocal converter. By this arrangement, it is possible to realize a wide angle of view of the whole stereoscopic-image-photographing optical system. Further, the cementing surface of the cemented lens has a weak converging function to correct aberrations of the diverging system occurring at the first lens unit 1G.

Further, since the second lens unit 2G, although having a weak refractive power as a whole, is of the meniscus form having a concave surface facing the object side, the movement of the second lens unit 2G from the object side toward the image side during focusing causes a principal point on the image side of a lens unit composed of the first lens unit 1G and the second lens unit 2G to move toward the object side. Therefore, it is possible to perform the adjustment of focus by moving the second lens unit 2G. Incidentally, although it is possible to perform the adjustment of focus by moving the first lens unit 1G, since the first lens unit 1G is provided for each of two optical paths for right and left eyes, it is difficult to construct an interlocking mechanism for two first lens units, and the use of the first lens unit for focusing becomes the cause for a deviation of the optical axis, etc. Therefore, it is undesirable to use the first lens unit for focusing.

The third lens unit 3G is constructed with, in order from the object side to the image side, a negative lens of meniscus form having a concave surface facing the object side, and two positive lenses, in such a way as to have, as the whole of the third lens unit 3G, the diverging function on the object side and the converging function on the image side for the purpose of securing a long back focal distance.

The fourth lens unit 4G is constructed with, in order from the object side to the image side, two positive lenses of meniscus form each having a convex surface facing the object side, a positive lens having a refractive power on the image side which is stronger than that on the object side, a three-element cemented lens having a negative refractive power as a whole and composed of a negative lens of meniscus form having a convex surface facing the object side, a positive lens of bi-convex form and a negative lens having a refractive power on the object side which is stronger than that on the image side, in such a way as to have the converging function on the object side and the diverging function on the image side for the purpose of preventing the exit pupil position of the stereoscopic-image-photographing optical system at the wide-angle end from becoming too close to the image sensor located at the image plane FP.

In general, if the exit pupil position becomes too close to the image sensor, the angle of incidence on the three-color separation prism varies with portions of the image plane, thereby causing color unevenness disadvantageously. In the three-element cemented lens, the positive lens of bi-convex form, which is located in the middle, is made from glass having a low refractive index, and the refractive index of each of the negative lenses, which sandwich therebetween the positive lens of bi-convex form, is made high, so that aberrations of the diverging system occur at the cementing surfaces. By this arrangement, aberrations of the converging system, which occur at the third lens unit 3G and the positive lenses of the fourth lens unit 4G, are corrected.

The fifth lens unit 5G is constructed with one positive lens having a refractive power on the object side which is stronger than that on the image side, for the purpose of correcting the unevenness of the back focal distance at the time of the assembly and adjustment of an individual stereoscopic-image-photographing optical system. Thus, the fifth lens unit 5G is arranged to be movable along the optical axis at the time of the assembly and adjustment of an individual stereoscopic-image-photographing optical system. Further, the fifth lens unit 5G may be arranged to be movable along the optical axis to compensate for the shift of focus occurring during the variation of magnification, according to the expansion and contraction of a lens barrel or the like due to a change in temperature.

The sixth lens unit 6G is constructed with one negative lens, for the purpose of preventing the exit pupil position of the stereoscopic-image-photographing optical system at the wide-angle end from becoming too close to the image sensor.

During the variation of magnification from the wide-angle end to the telephoto end, the third lens unit 3G and the fourth lens unit 4G move along the optical axis from the image side to the object side with the respective loci 3A and 4A shown in FIG. 2.

Figure 3:
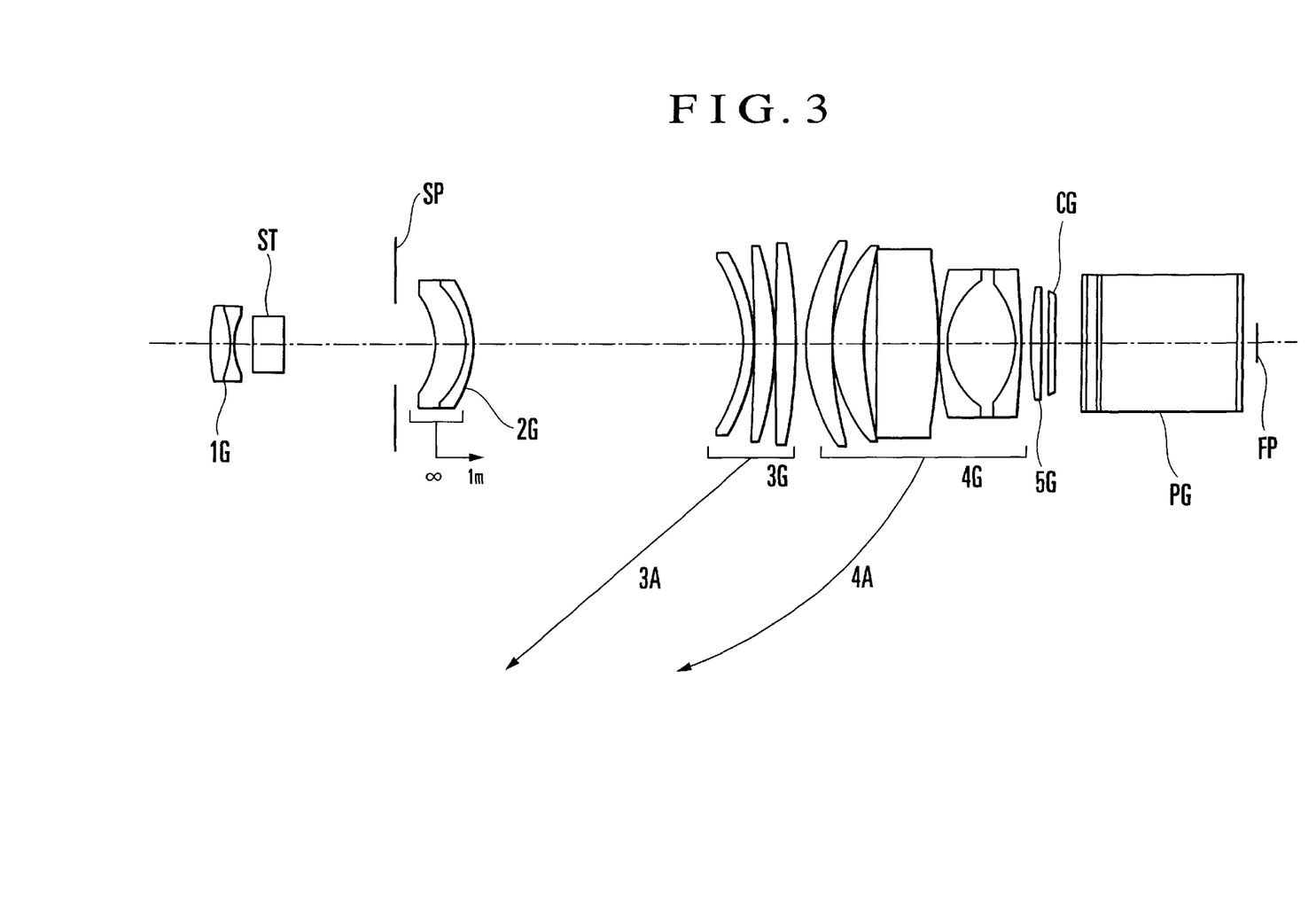
FIG. 3 is a lens block diagram showing a stereoscopic-image-photographing optical system according to a numerical example 2.
Figures 4A, 4B:
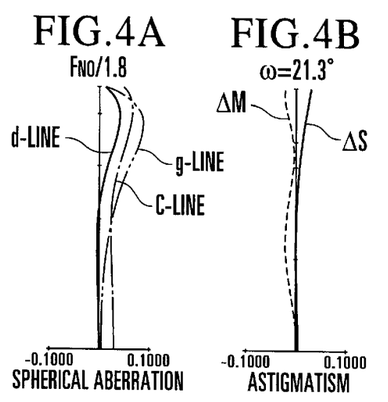
FIGS. 4A to 4D are aberration diagrams showing the various aberrations at the wide-angle end of the stereoscopic-image-photographing optical system according to the numerical example 1.
Figure 4C:
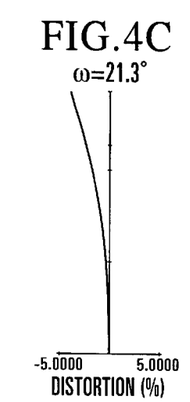
Figure 4D:
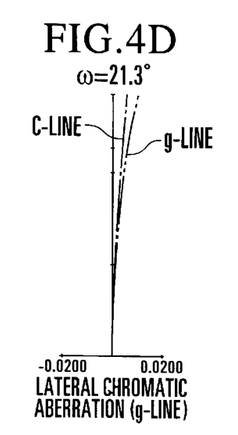
Figures 5A, 5B:
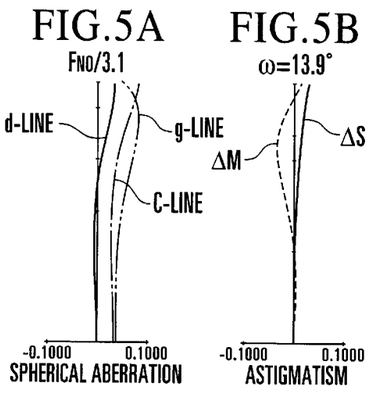
FIGS. 5A to 5D are aberration diagrams showing the various aberrations at the middle focal length position of the stereoscopic-image-photographing optical system according to the numerical example 1.
Figure 5C:
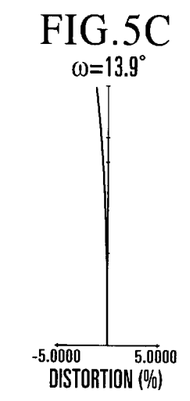
Figure 5D:
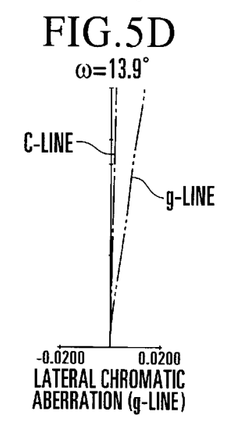
Figures 6A, 6B:
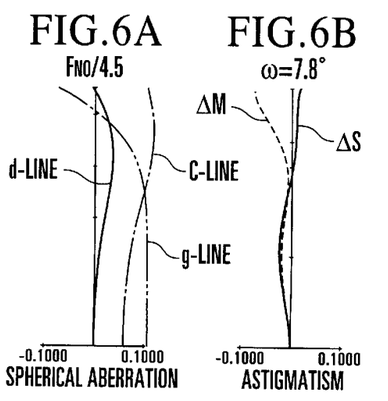
FIGS. 6A to 6D are aberration diagrams showing the various aberrations at the telephoto end of the stereoscopic-image-photographing optical system according to the numerical example 1.
Figure 6C:
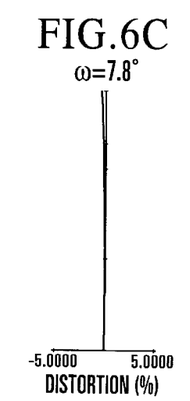
Figure 6D:
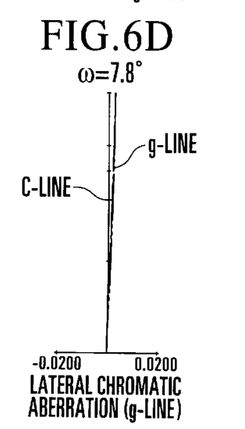
Figure 7A:
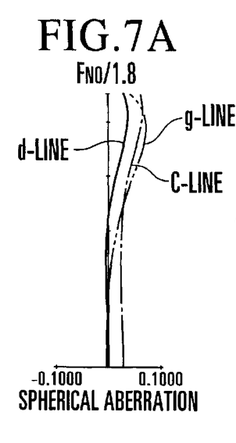
FIGS. 7A to 7D are aberration diagrams showing the various aberrations at the wide-angle end of the stereoscopic-image-photographing optical system according to the numerical example 2.
Figure 7B:
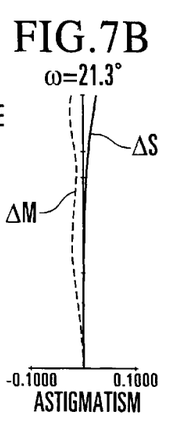
Figure 7C:
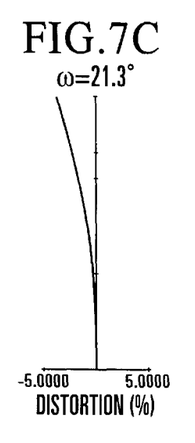
Figure 7D:
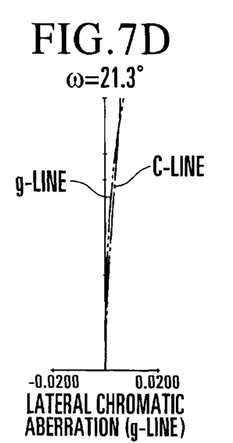
Figures 8A, 8B:
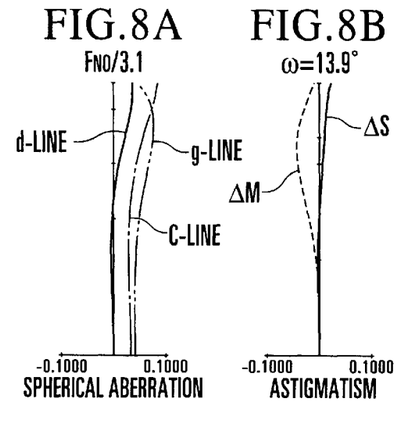
FIGS. 8A to 8D are aberration diagrams showing the various aberrations at the middle focal length position of the stereoscopic-image-photographing optical system according to the numerical example 2.
Figure 8C:
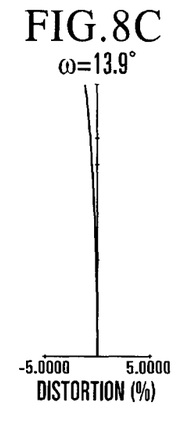
Figure 8D:
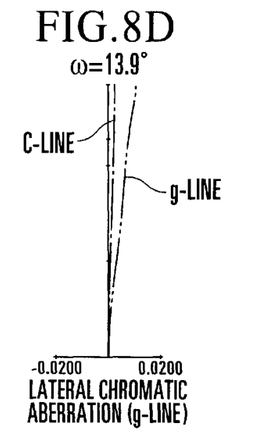
Figures 9A, 9B:
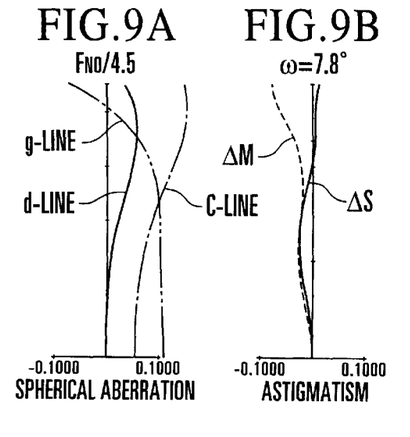
FIGS. 9A to 9D are aberration diagrams showing the various aberrations at the telephoto end of the stereoscopic-image-photographing optical system according to the numerical example 2.
Figure 9C:
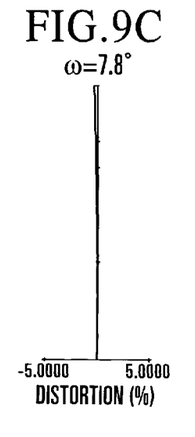
Figure 9D:
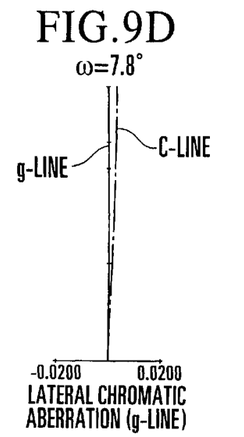

FIG. 3 is an optical sectional view showing a stereoscopic-image-photographing optical system according to a numerical example 2 of the invention. The basic construction of the stereoscopic-image-photographing optical system according to the numerical example 2 is the same as that shown in FIG. 2.

In FIG. 3, there are illustrated a first lens unit 1G of negative refractive power, a liquid crystal shutter ST, a second lens unit 2G having a weak refractive power, a third lens unit 3G of positive refractive power, a fourth lens unit 4G of positive refractive power, a fifth lens unit 5G of positive refractive power, a cover glass CG, a prism PG, which is illustrated by expanding and simplifying a three-color separation prism, and an image plane FP. The positional shift of an image plane relative to a change of the object distance (focusing) is compensated for by moving the second lens unit 2G along the optical axis. During the variation of magnification from the wide-angle end to the telephoto end, the third lens unit 3G and the fourth lens unit 4G move along the optical axis from the image side to the object side with the respective loci 3A and 4A shown in FIG. 3, to effect the variation of magnification and the compensation for the shift of an image plane due to the variation of magnification.

Further, the fifth lens unit 5G is arranged to be movable along the optical axis to correct the unevenness of the back focal distance at the time of the assembly and adjustment of an individual stereoscopic-image-photographing optical system.

In the meantime, in order to obtain high optical performance over the entire variable magnification range and the entire object distance range when the stereoscopic-image-photographing optical system according to the present embodiment is constructed with a zoom lens, it is preferable to satisfy at least one of the following conditions (a-1) and (a-2).

(a-1) The following condition is satisfied:

$$-0.1 < fw/f2 < 0.1 \qquad (1)$$

where fw is the focal length at the wide-angle end of the entire zoom lens, and f2 is the focal length of the second lens unit.

The condition (1) is provided for setting a limit to the ratio of the focal length at the wide-angle end of the entire zoom lens to the focal length of the second lens unit. If the lower limit of the condition (1) is exceeded, as a negative refractive power of the second lens unit becomes too strong, a composite refractive power of the first lens unit and the second lens unit becomes too strong, so that curvature of field occurs in the over direction. If the upper limit of the condition (1) is exceeded, as a positive refractive power of the second lens unit becomes too strong, a composite refractive power of the first lens unit and the second lens unit becomes weak, so that it disadvantageously becomes difficult to shorten the focal length at the wide-angle end of the entire zoom lens.

Further, it is more preferable to alter the condition (1) as follows:

$$-0.05 < fw/f2 < 0.05 \qquad (1A)$$

(a-2) At least one of the following conditions is satisfied:

$$-0.8 < fw/f1 < -0.3 \qquad (2)$$

$$0.03 < fw/f3 < 0.13 \qquad (3)$$

$$0.05 < fw/f4 < 0.16 \qquad (4)$$

$$0.02 < fw/f5 < 0.15 \qquad (5)$$

where f1 is the focal length of the first lens unit, f3 is the focal length of the third lens unit, f4 is the focal length of the fourth lens unit, f5 is the focal length of the fifth lens unit.

The condition (2) is provided for setting a limit to the ratio of the focal length at the wide-angle end of the entire zoom lens to the focal length of the first lens unit. If the lower limit of the condition (2) is exceeded, as a negative refractive power of the first lens unit becomes too strong, curvature of field occurs in the over direction. If the upper limit of the condition (2) is exceeded, as the focal length of the first lens unit becomes too long, it disadvantageously becomes difficult to shorten the focal length at the wide-angle end of the entire zoom lens.

The condition (3) is provided for setting a limit to the ratio of the focal length at the wide-angle end of the entire zoom lens to the focal length of the third lens unit. If the lower limit of the condition (3) is exceeded, as a positive refractive power of the third lens unit becomes too weak, the effective diameter of the fourth lens unit becomes large. If the upper limit of the condition (3) is exceeded, as a refractive power of the third lens unit becomes too strong, it disadvantageously becomes difficult to secure a sufficient back focal distance.

The condition (4) is provided for setting a limit to the ratio of the focal length at the wide-angle end of the entire zoom lens to the focal length of the fourth lens unit. If the lower limit of the condition (4) is exceeded, as a positive refractive power of the fourth lens unit becomes too weak, it becomes difficult for the lens units subsequent to the third lens unit toward the image side to reduce a virtual image formed by the first lens unit, so that, as a result, it becomes difficult to shorten the focal length at the wide-angle end of the entire zoom lens. If the upper limit of the condition (4) is exceeded, as a refractive power of the fourth lens unit becomes too strong, it disadvantageously becomes difficult to secure a sufficient back focal distance.

The condition (5) is provided for setting a limit to the ratio of the focal length at the wide-angle end of the entire zoom lens to the focal length of the fifth lens unit. If the lower limit of the condition (5) is exceeded, as a positive refractive power of the fifth lens unit becomes too weak, the amount of movement of the fifth lens unit for correcting the unevenness of the back focal distance becomes large. If the upper limit of the condition (5) is exceeded, as a refractive power of the fifth lens unit becomes too strong, although the amount of movement of the fifth lens unit can be made small, aberrations occur after the adjustment of the zoom lens disadvantageously.

Incidentally, the stereoscopic-image-photographing optical systems shown in the numerical examples 1 and 2 can be used with only one first lens unit provided and the triangular prism and the liquid crystal shutter for combining images for right and left eyes omitted. Such optical systems have the advantages that the effective diameter of a lens member on the object side is small and the position of an entrance pupil does not vary during the variation of magnification, and, therefore, when used for a surveillance camera or an eyepiece lens part of a telescope or a microscope, can be used in the state of having no eclipse over the entire variable magnification range.

Next, numerical data of the numerical examples 1 and 2 of the invention are shown.

In the numerical data of the numerical examples 1 and 2, Ri denotes the radius of curvature of the i-th surface, when counted from the object side, Di denotes the interval between the i-th surface and the (i+1)th surface, when counted from the object side, Ni and vi respectively denote the refractive index and Abbe number of the i-th optical member, when counted from the object side.

The shape of an aspheric surface is expressed in the coordinates with an X axis in the optical axis direction and an H axis in the direction perpendicular to the optical axis, the direction in which light advances being taken as positive, by the following equation:

$$X = \frac{(1/R)H^2}{1+\sqrt{1-(1+K)(H/R)^2}} + A_4 H^4 + A_6 H^6 + A_8 H^8 + A_{10} H^{10} + A_3 H^3 + A_5 H^5$$

where R is the radius of osculating sphere, and K, $A_4$, $A_6$, $A_8$, $A_{10}$, $A_3$ and $A_5$ are aspheric coefficients.

Further, the indication "D–Z" means "$\times 10^{-Z}$".

In addition, the values of the factors in the above-mentioned conditions (1) to (5) for the numerical examples 1 and 2 are listed in Table-1.

FIGS. 4A to 4D, FIGS. 5A to 5D and FIGS. 6A to 6D are aberration diagrams showing the various aberrations at the wide-angle end, at the middle focal length position and at the telephoto end, respectively, of the stereoscopic-image-photographing optical system according to the numerical example 1. FIGS. 7A to 7D, FIGS. 8A to 8D and FIGS. 9A to 9D are aberration diagrams showing the various aberrations at the wide-angle end, at the middle focal length position and at the telephoto end, respectively, of the stereoscopic-image-photographing optical system according to the numerical example 2.

Numerical Example 1 f=7.70790 Fno=1:1.8–4.5 2ω=42.6°–15.6°

| | | | |
|---|---|---|---|
| R 1 = 39.072* | D 1 = 2.70 | N 1 = 1.68893 | v 1 = 31.1 |
| R 2 = –15.519 | D 2 = 0.50 | N 2 = 1.88300 | v 2 = 40.8 |
| R 3 = 11.150 | D 3 = 2.80 | | |
| R 4 = ∞ | D 4 = 4.60 | N 3 = 1.51633 | v 3 = 64.1 |
| R 5 = ∞ | D 5 = 16.60 | | |
| R 6 = Stop | D 6 = Variable | | |
| R 7 = –13.791 | D 7 = 4.45 | N 4 = 1.83400 | v 4 = 37.2 |
| R 8 = –13.184 | D 8 = 1.63 | N 5 = 1.48749 | v 5 = 70.2 |
| R 9 = –18.944 | D 9 = Variable | | |
| R10 = –21.826 | D10 = 1.50 | N 6 = 1.83400 | v 6 = 37.2 |
| R11 = –24.450 | D11 = 0.15 | | |
| R12 = 1409.744 | D12 = 3.05 | N 7 = 1.49700 | v 7 = 81.5 |
| R13 = –66.290 | D13 = 0.15 | | |
| R14 = 377.774 | D14 = 2.70 | N 8 = 1.49700 | v 8 = 81.5 |
| R15 = –119.314 | D15 = Variable | | |
| R16 = 26.752 | D16 = 3.50 | N 9 = 1.49700 | v 9 = 81.5 |
| R17 = 42.583 | D17 = 0.15 | | |
| R18 = 22.200 | D18 = 5.10 | N10 = 1.49700 | v10 = 81.5 |
| R19 = 60.682 | D19 = 2.36 | | |
| R20 = –153.621 | D20 = 7.94 | N11 = 1.51633 | v11 = 64.1 |
| R21 = –57.594 | D21 = 0.15 | | |
| R22 = 45.062 | D22 = 1.10 | N12 = 1.80400 | v12 = 46.6 |
| R23 = 12.280 | D23 = 10.66 | N13 = 1.48749 | v13 = 70.2 |
| R24 = –14.149 | D24 = 0.90 | N14 = 1.83400 | v14 = 37.2 |
| R25 = –82.817 | D25 = Variable | | |
| R26 = 49.544 | D26 = 2.05 | N15 = 1.48749 | v15 = 70.2 |
| R27 = –181.148 | D27 = Variable | | |
| R28 = –212.449 | D28 = 1.00 | N16 = 1.83400 | v16 = 37.2 |
| R29 = ∞ | D29 = 3.80 | | |
| R30 = ∞ | D30 = 0.81 | N17 = 1.55000 | v17 = 60.0 |
| R31 = ∞ | D31 = 1.60 | N18 = 1.52000 | v18 = 69.0 |
| R32 = ∞ | D32 = 0.57 | N19 = 1.55000 | v19 = 60.0 |
| R33 = ∞ | D33 = 20.00 | N20 = 1.58913 | v20 = 61.2 |
| R34 = ∞ | D34 = 0.80 | N21 = 1.51633 | v21 = 64.2 |
| R35 = ∞ | | | |

| Variable | Focal Length | | |
|---|---|---|---|
| Separation | 7.71 | 12.14 | 21.83 |
| D 6 | 6.48 | 6.48 | 6.48 |
| D 9 | 41.01 | 18.40 | 1.34 |
| D15 | 0.71 | 10.67 | 0.65 |
| D25 | 1.30 | 13.94 | 41.02 |
| D27 | 1.27 | 1.27 | 1.27 |

*Aspheric Surface

Aspheric Coefficients

R 1 R=3.90723D+01 K=1.01670D+01
$A_4$=–1.91702D–04 $A_6$=–2.76982D–05 $A_8$=4.99103D–07
$A_{10}$=–5.39796D–09 $A_3$=1.72941D–04 $A_5$=1.35519D–04

Numerical Example 2 f=7.71222 Fno=1:1.8–4.5 2ω=42.6°–15.6°

| | | | |
|---|---|---|---|
| R 1 = 36.673* | D 1 = 2.76 | N 1 = 1.68893 | v 1 = 31.1 |
| R 2 = –15.177 | D 2 = 0.55 | N 2 = 1.88300 | v 2 = 40.8 |
| R 3 = 10.971 | D 3 = 2.80 | | |
| R 4 = ∞ | D 4 = 4.60 | N 3 = 1.51633 | v 3 = 64.1 |
| R 5 = ∞ | D 5 = 16.60 | | |
| R 6 = Stop | D 6 = Variable | | |
| R 7 = –13.222 | D 7 = 4.41 | N 4 = 1.83400 | v 4 = 37.2 |
| R 8 = –12.690 | D 8 = 1.10 | N 5 = 1.48749 | v 5 = 70.2 |
| R 9 = –18.313 | D 9 = Variable | | |
| R10 = –22.816 | D10 = 1.50 | N 6 = 1.83400 | v 6 = 37.2 |
| R11 = –26.988 | D11 = 0.15 | | |
| R12 = –221.682 | D12 = 3.03 | N 7 = 1.49700 | v 7 = 81.5 |
| R13 = –48.660 | D13 = 0.15 | | |
| R14 = 784.072 | D14 = 2.96 | N 8 = 1.49700 | v 8 = 81.5 |
| R15 = –79.880 | D15 = Variable | | |
| R16 = 27.687 | D16 = 3.83 | N 9 = 1.49700 | v 9 = 81.5 |
| R17 = 56.167 | D17 = 0.15 | | |
| R18 = 22.534 | D18 = 4.63 | N10 = 1.49700 | v10 = 81.5 |
| R19 = 53.242 | D19 = 1.93 | | |
| R20 = –1588.369 | D20 = 9.09 | N11 = 1.51633 | v11 = 64.1 |
| R21 = –71.717 | D21 = 0.15 | | |
| R22 = 53.929 | D22 = 1.10 | N12 = 1.80400 | v12 = 46.6 |
| R23 = 11.985 | D23 = 10.12 | N13 = 1.48749 | v13 = 70.2 |
| R24 = –14.479 | D24 = 0.90 | N14 = 1.83400 | v14 = 37.2 |
| R25 = –72.344 | D25 = Variable | | |
| R26 = 59.227 | D26 = 1.60 | N15 = 1.48749 | v15 = 70.2 |
| R27 = ∞ | D27 = 1.00 | | |
| R28 = ∞ | D28 = 1.00 | N16 = 1.51633 | v16 = 64.1 |
| R29 = ∞ | D29 = 3.78 | | |
| R30 = ∞ | D30 = 0.81 | N17 = 1.55000 | v17 = 60.0 |
| R31 = ∞ | D31 = 1.60 | N18 = 1.52000 | v18 = 69.0 |
| R32 = ∞ | D32 = 0.57 | N19 = 1.55000 | v19 = 60.0 |
| R33 = ∞ | D33 = 20.00 | N20 = 1.58913 | v20 = 61.2 |
| R34 = ∞ | D34 = 0.80 | N21 = 1.51633 | v21 = 64.2 |
| R35 = ∞ | | | |

-continued

| Variable | Focal Length | | |
|---|---|---|---|
| Separation | 7.71 | 12.11 | 21.83 |
| D 6 | 5.91 | 5.91 | 5.91 |
| D 9 | 39.89 | 17.95 | 1.40 |
| D15 | 1.49 | 11.20 | 1.48 |
| D25 | 1.43 | 13.67 | 39.93 |

*Aspheric Surface

Aspheric Coefficients

R 1 R=3.66727D+01 K=1.46925D+01

$A_4$=−1.74115D−04 $A_6$=−2.33498D−05 $A_8$=4.11769D−07

$A_{10}$=−4.42050D−09 $A_3$=1.60254D−04 $A_5$=1.15093D−04

TABLE 1

| | | Numerical Example | |
|---|---|---|---|
| Condition | | 1 | 2 |
| (1) | fw/f2 | 0.0002 | −0.003 |
| (2) | fw/f1 | −0.550 | −0.551 |
| (3) | fw/f3 | 0.083 | 0.083 |
| (4) | fw/f4 | 0.098 | 0.104 |
| (5) | fw/f5 | 0.096 | 0.063 |

According to the present embodiment as described in the foregoing, it is possible to attain a stereoscopic-image-photographing optical system and a stereoscopic image photographing apparatus capable of obtaining parallactical images having excellent optical performance. In the stereoscopic-image-photographing optical system and the stereoscopic image photographing apparatus, when images having parallax for right and left eyes are combined at the pupil of the optical system or in the vicinity thereof, and the parallactical images are led alternately in a time-series manner to one image sensor so as to obtain the different parallactical images, the variation of magnification of the parallactical images during a photographing operation can be performed, and the adjustment of focus according to a change of the object distance by a manual operation or an automatic operation can be performed with ease.

In addition, the compensation for the shift of an image plane due to a change of the object distance can be performed easily. In particular, in a case where the adjustment of focus is performed by a manual operation, the amount of drawing-out of the focus adjusting lens unit is made constant at any position of the variation of magnification. Further, an aspheric surface is used in the first lens unit so as to decrease astigmatism and distortion occurring at the first lens unit, so that it is possible to attain a stereoscopic-image-photographing optical system and a stereoscopic image photographing apparatus capable of obtaining good optical performance as a whole.

What is claimed is:

1. An optical system, comprising:

a pair of front optical components;

an optical member for superposing respective optical axes of said pair of front optical components on each other;

a rear optical component disposed such that the superimposed optical axes coincide with an optical axis of said rear optical component, said rear optical component including a lens unit arranged to move during zooming, and a lens unit arranged to move during focusing and disposed on an object side of said lens unit arranged to move during zooming; and shutter means capable of independently controlling amounts of transmission of light fluxes respectively entering said pair of front optical components from an object, wherein said optical system forms parallactical images in a time-series manner by causing said shutter means to alternately change the amounts of transmission of light fluxes respectively entering said pair of front optical components from the object.

2. An optical system according to claim 1, wherein each of said pair of front optical components includes a first lens unit of negative optical power, and wherein said rear optical component includes, in order from the object side to an image side:

a second lens unit, said second lens unit moving during focusing;

a third lens unit of positive optical power, said third lens unit moving during zooming; and a fourth lens unit of positive optical power, said fourth lens unit moving during zooming.

3. An optical system according to claim 2, wherein said rear optical component further includes:

a fifth lens unit of positive refractive power disposed on the image side of said fourth lens unit.

4. An optical system according to claim 2, wherein said rear optical component further includes:

a fifth lens unit of positive refractive power disposed on the image side of said fourth lens unit; and a sixth lens unit of negative refractive power disposed on the image side of said fifth lens unit.

5. An optical system according to claim 2, wherein said first lens unit consists of a cemented lens composed of a positive lens element of bi-convex form and a negative lens element of bi-concave form.

6. An optical system according to claim 2, wherein said first lens unit includes an aspheric surface.

7. An optical system according to claim 2, wherein said second lens unit consists of a cemented lens of meniscus form having a concave surface facing the object side as a whole and composed of a lens element of meniscus form having a concave surface facing the object side and a negative lens element of meniscus form having a concave surface facing the object side.

8. An optical system according to claim 2, wherein said third lens unit consists of a negative lens element of meniscus form having a concave surface facing the object side and two positive lens elements.

9. An optical system according to claim 2, wherein said fourth lens unit includes a cemented lens having a cementing surface which has a diverging function.

10. An optical system according to claim 2, wherein said optical system satisfies the following condition:

−0.1<fw/f2<0.1 where fw is the focal length at a wide-angle end of said optical system, and f2 is the focal length of said second lens unit.

11. An optical system according to claim 2, wherein said optical system satisfies the following condition:

−0.8<fw/f1<−0.3 where fw is the focal length at a wide-angle end of said optical system, and f1 is the focal length of said first lens unit.

12. An optical system according to claim 2, wherein said optical system satisfies the following condition:

$$0.03 < fw/f3 < 0.13$$

where fw is the focal length at a wide-angle end of said optical system, and f3 is the focal length of said third lens unit.

13. An optical system according to claim 2, wherein said optical system satisfies the following condition:

$$0.05 < fw/f4 < 0.16$$

where fw is the focal length at a wide-angle end of said optical system, and f4 is the focal length of said fourth lens unit.

14. An optical system according to claim 3, wherein said optical system satisfies the following condition:

$$0.02 < fw/f5 < 0.15$$

where fw is the focal length at a wide-angle end of said optical system, and f5 is the focal length of said fifth lens unit.

15. An optical system according to claim 3, wherein said optical system satisfies the following conditions:

$$-0.8 < fw/f1 < -0.3$$

$$0.03 < fw/f3 < 0.13$$

$$0.05 < fw/f4 < 0.16$$

$$0.02 < fw/f5 < 0.15$$

where fw is the focal length at a wide-angle end of said optical system, f1 is the focal length of said first lens unit, f3 is the focal length of said third lens unit, f4 is the focal length of said fourth lens unit, and f5 is the focal length of said fifth lens unit.

16. An optical system according to claim 1, wherein said rear optical component further includes a lens unit arranged to move in adjusting a back focal distance.

17. An optical system according to claim 1, further comprising:
a stop disposed at a position where the respective optical axes of said pair of front optical components intersect or in the vicinity of said position.

18. An optical system according to claim 1, wherein said optical member is a triangular prism having two reflection surfaces, and wherein the respective optical axes of said pair of front optical components and the optical axis of said rear optical component intersect on a ridgeline formed by said two reflection surfaces.

19. An optical system according to claim 1, wherein said shutter means is disposed between each of said pair of front optical components and said optical member.

20. An optical system according to claim 1, wherein each of said pair of front optical components has a negative refractive power as a whole, and wherein said rear optical component has a positive refractive power as a whole.

21. An optical system according to claim 1, wherein said shutter means is a liquid crystal shutter.

22. An optical system, comprising:
a pair of front optical components, each of said pair of front optical components having an optical power;
an optical member for superposing respective optical axes of said pair of front optical components on each other;
a rear optical component disposed such that the superimposed optical axes coincide with an optical axis of said rear optical component, said rear optical component including, on a most object side thereof, a lens unit arranged to move during focusing; and
shutter means capable of independently controlling amounts of transmission of light fluxes respectively entering said pair of front optical components from an object,
wherein said optical system forms parallactical images in a time-series manner by causing said shutter means to alternately change the amounts of transmission of light fluxes respectively entering said pair of front optical components from the object,
wherein no lens unit is present between said optical member and said rear optical component.

23. An optical system according to claim 22, wherein said rear optical component further includes a lens unit arranged to move in adjusting a back focal distance.

24. An optical system according to claim 22, further comprising:
a stop disposed at a position where the respective optical axes of said pair of front optical components intersect or in the vicinity of said position.

25. An optical system according to claim 22, wherein said optical member is a triangular prism having two reflection surfaces, and wherein the respective optical axes of said pair of front optical components and the optical axis of said rear optical component intersect on a ridgeline formed by said two reflection surfaces.

26. An optical system according to claim 22, wherein said shutter means is disposed between each of said pair of front optical components and said optical member.

27. An optical system according to claim 22, wherein each of said pair of front optical components has a negative refractive power as a whole, and
wherein said rear optical component has a positive refractive power as a whole.

28. An optical system according to claim 22, wherein said shutter means is a liquid crystal shutter.

29. A stereoscopic image photographing apparatus, comprising:
an optical system according to claim 1; and
an image sensor disposed on an image forming plane of said optical system.

30. A stereoscopic image photographing apparatus, comprising:
an optical system according to claim 22; and
an image sensor disposed on an image forming plane of said optical system.

* * * * *

UNITED STATES PATENT AND TRADEMARK OFFICE
CERTIFICATE OF CORRECTION

PATENT NO. : 6,686,988 B1
DATED : February 3, 2004
INVENTOR(S) : Saburo Sugawara It is certified that error appears in the above-identified patent and that said Letters Patent is hereby corrected as shown below:

Column 9,
Line 56, "lens." should read -- lens --.

Column 11,
Line 13, "vi" should read -- vi --.

Column 15,
Line 19, "25" should read -- f5 --.

Signed and Sealed this

Twenty-second Day of June, 2004

JON W. DUDAS
*Acting Director of the United States Patent and Trademark Office*